(12) United States Patent
Wivagg

(10) Patent No.: US 6,390,509 B1
(45) Date of Patent: May 21, 2002

(54) SHROUD CONNECTION FOR REPLACEMENT CORE SPRAY PIPE

(75) Inventor: Adrian Peter Wivagg, Tolland, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/492,303

(22) Filed: Jan. 27, 2000

(51) Int. Cl.$^7$ .................................................. F16L 5/00
(52) U.S. Cl. ........................ 285/191; 285/15; 285/185
(58) Field of Search .......................... 285/15, 906, 191, 285/185, 179, 32, 138.1; 29/890.149, 441.1, 443, 464, 525.05

(56) References Cited

U.S. PATENT DOCUMENTS

| | | | |
|---|---|---|---|
| 409,216 A | * | 8/1889 | Magee ................. 285/185 X |
| 706,983 A | * | 8/1902 | Merrie et al. ............. 285/191 |
| 1,651,883 A | * | 12/1927 | Frost ........................ 285/191 |
| 2,321,417 A | * | 6/1943 | Pepersack ................. 285/191 |
| 2,380,735 A | * | 7/1945 | Ebel et al. ................. 285/191 |
| 2,428,381 A | * | 10/1947 | Parry ..................... 285/179 X |
| 2,746,432 A | * | 5/1956 | Rossi ........................ 285/191 |
| 4,846,509 A | | 7/1989 | Moore |
| 5,735,551 A | | 4/1998 | Whitman et al. |
| 5,737,380 A | | 4/1998 | Deaver et al. |
| 6,131,962 A | * | 10/2000 | Jensen et al. ........... 285/185 X |
| 6,236,700 B1 | * | 5/2001 | Erbes et al. .............. 285/15 X |
| 6,260,888 B1 | * | 7/2001 | McLaughlin ........... 285/185 X |

\* cited by examiner

*Primary Examiner*—Lynne H. Browne
*Assistant Examiner*—David E. Bochna

(57) ABSTRACT

A shroud connection device for replacement core spray piping systems in a boiling water reactor includes replacement pipe, first and second coupling devices, and a rod. The pipe has a spherically shaped end, and includes a penetration extending through it from an inside portion to an outside portion. The first coupling device has first and second ends, the first end being dimensioned so as to receive the spherically shaped end of the pipe, and the second end abutting an outside portion of the shroud. The second coupling device has third and fourth ends, the third end abutting an inside portion of the shroud. The rod extends between the second coupling device and the penetration in the pipe.

26 Claims, 5 Drawing Sheets

SHROUD CONNECTION FOR REPLACEMENT CORE SPRAY PIPE

BACKGROUND OF THE INVENTION

1. Field of the Invention

The present invention relates generally to an apparatus and method for connecting replacement core spray piping to the shroud of a boiling water reactor. More specifically, the invention relates to an apparatus and method for connecting core spray piping to a BWR shroud without having to weld or bolt the replacement piping to either the shroud or piping internal to the shroud.

2. Description of Related Art

Boiling water reactors include core spray piping to provide cooling water to the fuel in the event a highly unlikely casualty occurs resulting in a loss of core heat removal capability, such as a loss of coolant accident (LOCA). This core spray piping receives water pumped from a reservoir, such as a pressure suppression pool, and delivers it to the core. The piping from the reservoir enters the reactor vessel above the core shroud, via a safe end. The piping then goes into a tee that divides the flow into two pipes. Each of these two pipes then curve around the interior of the vessel and connect to a vertically oriented downcomer pipe section. The downcomer pipe section extends downward into the region between the core shroud and the reactor vessel. The downcomer pipe section then enters the core shroud through another safe end and terminates in another tee located near the top of the shroud. The tee located within the shroud divides the flow into two semicircular core spray spargers supported on the interior of the core shroud. Typically, there are two of these spray systems per reactor vessel, which serve four semicircular spray spargers in the shroud.

The piping in the core spray systems is stainless steel, typically 304 SS, that is welded at each connection point. These welded connections are susceptible to intergrantular stress corrosion cracking (IGSCC), which can result in cracks and subsequent leakage from the spray system pipes. In the BWR core spray system, the downcomer piping section, including that portion extending through the shroud, has been particularly prone to IGSCC. As a result various devices have been devised for repairing this portion of piping.

One such device, disclosed in U.S. Pat. No. 5,735,551 issued to Whitman et al., includes first and second L-shaped housings. The housings surround the faulty piping, and are bolted together. A first seal is mounted within each housing to seal the housings against the outer periphery of the downcomer piping. A second seal is mounted at an end of the each housing to seal each against the outer wall of the core shroud. The housing assembly is retained against the outer wall of the core shroud by a threaded rod extending through the shroud. The threaded rod reacts at one end against the housing assembly, and at the other end against a cap mounted on the inside of the shroud.

The above-described device has several drawbacks. First, the housings require a high degree of casting accuracy to ensure tight coupling around the core spray line piping elbow. Second, the device is extremely difficult to assemble in its intended use environment. The device is intended for effecting a repair to a pipe in the downcomer region between the reactor vessel and core shroud, while this region is full of water. The amount of assembly parts required and the fitting tolerances make this device nearly unworkable in an underwater environment. Third, the cap is mounted directly onto the core spray sparger. Thus, a portion of the reaction force from the threaded rod acts on the sparger and is also transmitted to the existing downcomer piping. This arrangement increases the likelihood of damage to the sparger piping within the shroud and the likelihood of further damage to the downcomer piping.

Another device, disclosed in U.S. Pat. No. 5,737,380 issued to Deaver et al., provides for the permanent repair of core spray piping by replacing damaged piping with new piping. The replacement downcomer piping includes articulating vertical pipe connectors. These articulating pipe connectors allow for quick and easy pipe coupling, and also provide for thermal expansion and contraction without undue stresses. This device also has drawbacks. First, the downcomer elbow portion is bolted to the shroud, thus this portion of piping remains subject to rotational stresses. Second, this device requires precision holes to be made in the shroud. Third, device is time consuming to implement in the underwater environment of the downcomer region.

Thus, there is a need to provide a device and method for providing the permanent repair of core spray piping, while alleviating the stresses in the piping connecting to the shroud. There is also a need to provide a device and method for achieving this goal without undue cost, complexity, and time.

SUMMARY OF THE INVENTION

It is therefore an object of the present invention to provide an apparatus and method for connecting core spray piping to a BWR shroud without having to weld or bolt the replacement piping to either the shroud or piping internal to the shroud.

It is another object of the present invention to provide an inexpensive, quick, and easy-to-install apparatus and method for connecting core spray piping to a BWR shroud.

In one aspect of the present invention a shroud connection device for replacement core spray piping systems in a boiling water reactor comprises a pipe, a first coupling device, a second coupling device, and a rod. The pipe has a spherically shaped end and includes a penetration extending through it from an inside portion to an outside portion. The first coupling device has a first end dimensioned to receive the spherically shaped end and second ends, and a second end that abuts the outside portion of the shroud. The second coupling device has a third end that abuts the inside portion of the shroud, and a fourth end. The rod extends between the second coupling device and the penetration.

In another aspect of the present invention a device for connecting replacement core spray piping to a shroud in a boiling water reactor comprises flow directing means, interface means, force coupling means, and holding force transmitting means. The flow directing means directs core spray fluid flow within the reactor. The interface means receives an end of the flow directing means and transmits forces acting on the flow directing conduit to an outer wall of the shroud. The interface means completely surrounds a piping connection extending between inner and outer walls of the shroud. The coupling means provides a coupling force to couple the flow directing means to the interface means. The coupling force transmitting means transmits the coupling force to the inner wall of the shroud.

In yet another aspect of the present invention a method of connecting core spray piping to a shroud of a boiling water reactor includes an inserting step, two positioning steps, a connecting step, and an adjusting step. In the inserting step, a pipe having a spherically shaped end is inserted into a first end of a first coupling element. In the first positioning step, a second end of the first coupling element is positioned to completely surround at least a first end of a pipe connection extending through the shroud, and to abut an outside portion of the shroud. In the third positioning step, a third end of a second coupling element is positioned to completely surround a second end of the pipe connection, and to abut an inside portion of the shroud. In the connecting step, a tightening rod is connected between the second coupling element and a penetration extending from an inside portion of the pipe to an outside portion. In the adjusting step, the tightening rod is adjusted.

These and other objects, aspects, advantages and features of the present invention will become more apparent to those skilled in the art when the following detailed description is read in conjunction with the accompanying drawings.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
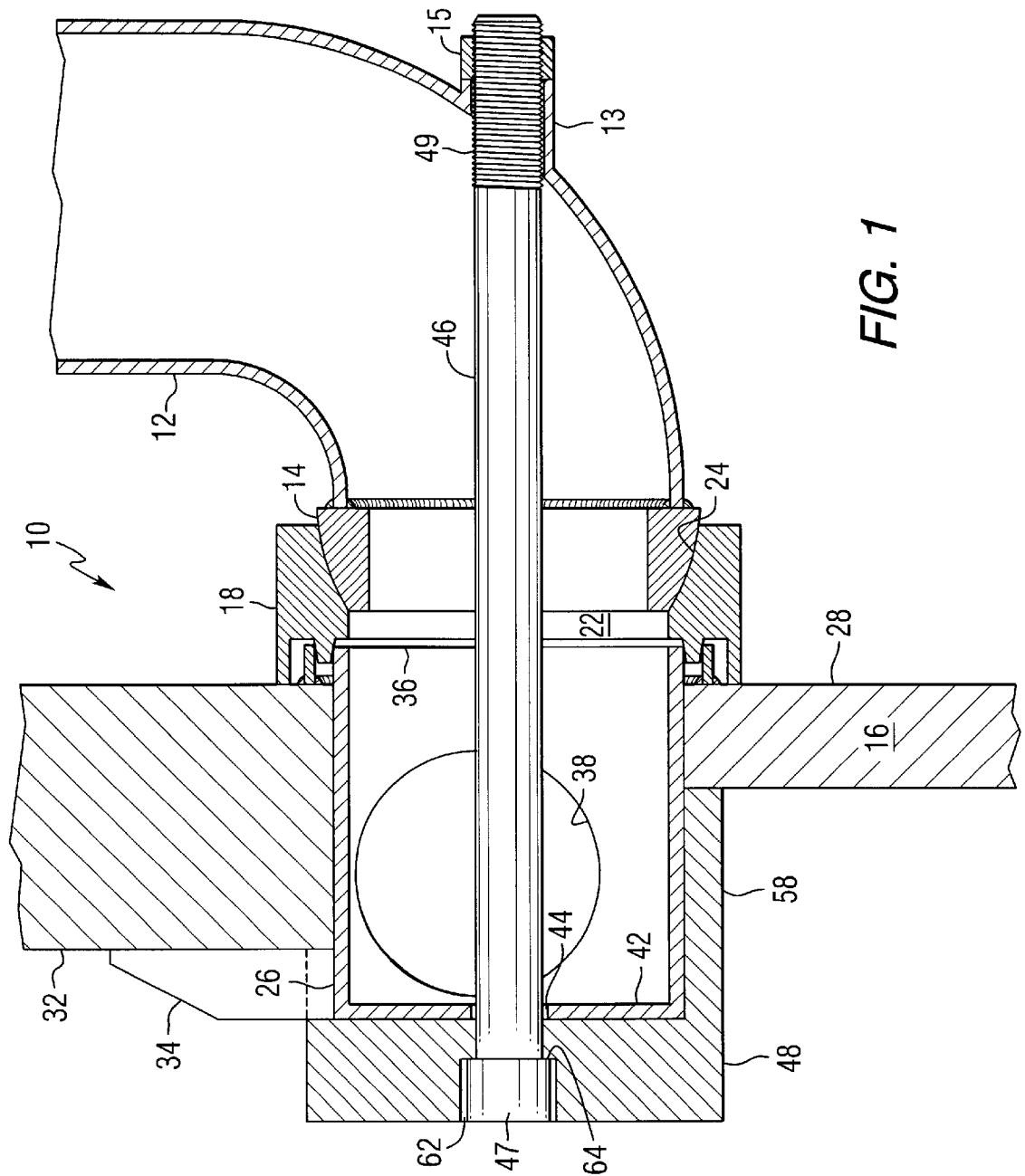
FIG. 1 is a cross sectional side view of the core spray piping replacement connection of the present invention.

A cross sectional side view of the core spray system replacement piping shroud connection is depicted in FIG. 1. As can be seen from this Figure, the connection 10 takes advantage of the so-called ball and socket type joint connection. Specifically, the connection 10 includes the replacement piping 12, which has a spherically shaped ball 14 on the end that is to mate with the shroud 16. This ball 14 may be a separate piece that is welded onto the pipe 12 end, the pipe 12 may be cast with this type of end, the ball 14 may be ground into the end, or provided in any other fashion known to the skilled artisan. In the preferred embodiment, the ball 14 is welded onto the end of the pipe. The ball 14 is received into a first coupling device 18, known as an anchor socket. The anchor socket 18 includes an opening 22 extending through it and a seat 24 within the opening 22 dimensioned so that ball 14 fits snugly thereon. The anchor socket 18 abuts the outside wall 28 of shroud 16 when the connection 10 is established.

The anchor socket 18 provides the interface between the replacement pipe 12 and the existing core sparging system piping connection 26 which, in the preferred embodiment is a tee box. The tee box 26 extends from the outer wall 28 of the shroud 16 to the inner wall 32 of the shroud 16, and is provided with a stabilizing bracket 34. That portion of tee box 26 extending from the outer wall 28 includes an opening 36 that receives the core spray system fluid flow, and splits the flow into at least two additional pipes. One of the openings 38 receiving this split flow is shown in FIG. 1.

Figure 2:
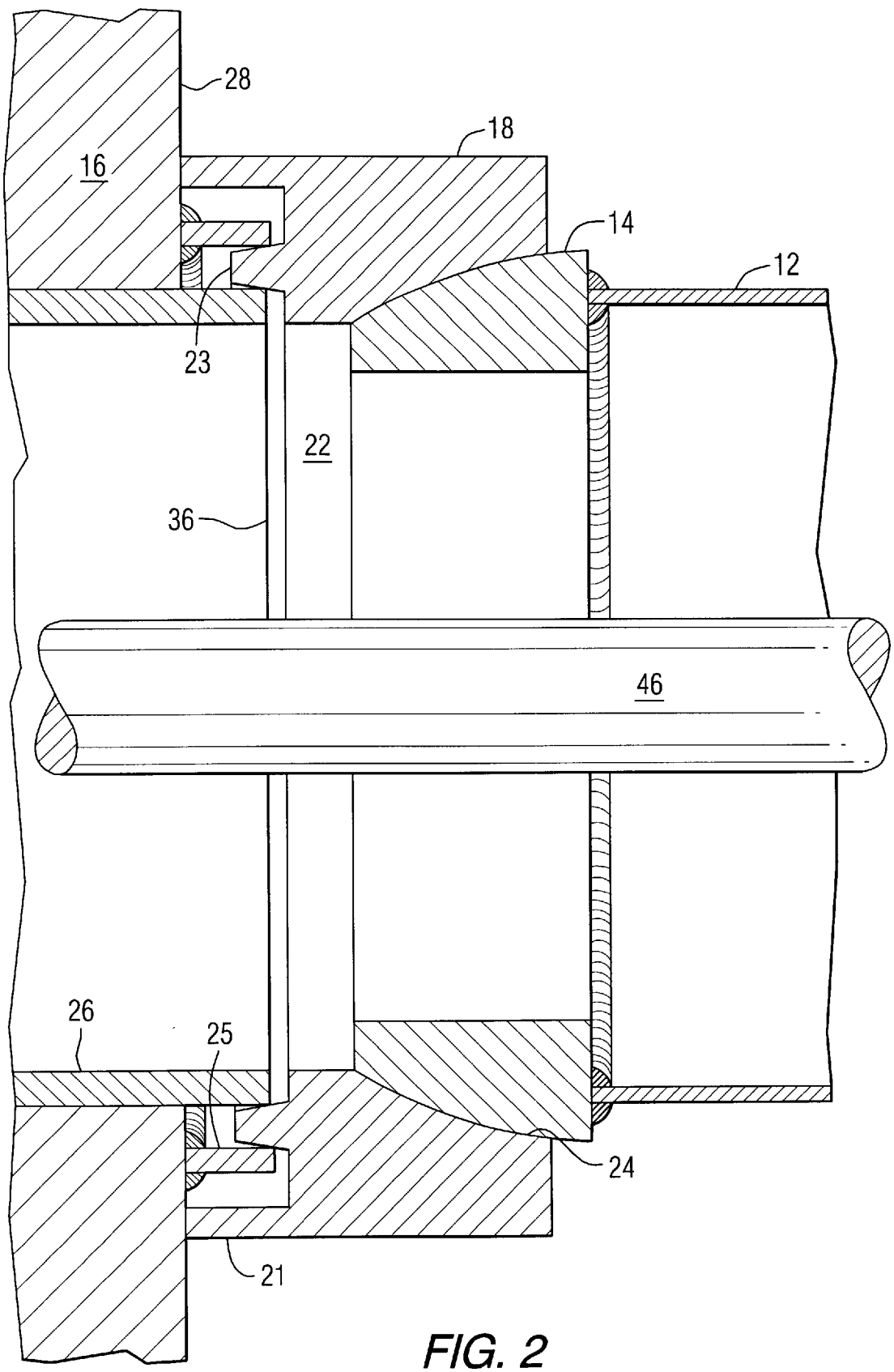
FIG. 2 is an expanded cross sectional side view of the replacement piping/core shroud interface of the present invention.

As shown more particularly in FIG. 2, the anchor socket 18 includes first and second circumferential rings 21, 23, respectively, to provide the seal between the pipe 12 and the tee box 26 by interference fit and baffle. First circumferential ring 21 is longer than second circumferential ring 23, and abuts directly against the shroud outer wall 28. Second circumferential ring 23 fits between that portion of the tee box 26 extending from the outer wall 28 and the pre-existing pipe safe end 25. The pipe safe end 25 is cut, after removing the damaged piping, to a predetermined length to allow second circumferential ring 23 to be seated between the remaining safe end 25 and the tee box 26.

The above-described ball and socket type joint lowers the load imparted to the shroud 16 by the replacement core spray pipe 12. This arrangement also allows the pipe 12 to rotate relative to the shroud 16, as a result of induced mechanical and thermal loads, without creating undue stresses in pipe 12. Vertical shear is transmitted through second circumferential ring 23 directly to the pipe 12 and then to the shroud 16 without going through any welds.

Referring once again to FIG. 1, that portion of the tee box 26 extending from the shroud inner wall 32 includes a closed end 42. However, for the instant invention, an opening 44 is introduced into the end to receive a rod 46, discussed further below. Covering the end 42 of the tee box 26 is another coupling device 48, known as a stool. The stool 48 receives, and provides an anchor point for, the rod 46 that provides the force for coupling the pipe 12 to the shroud 16.

Figure 3:
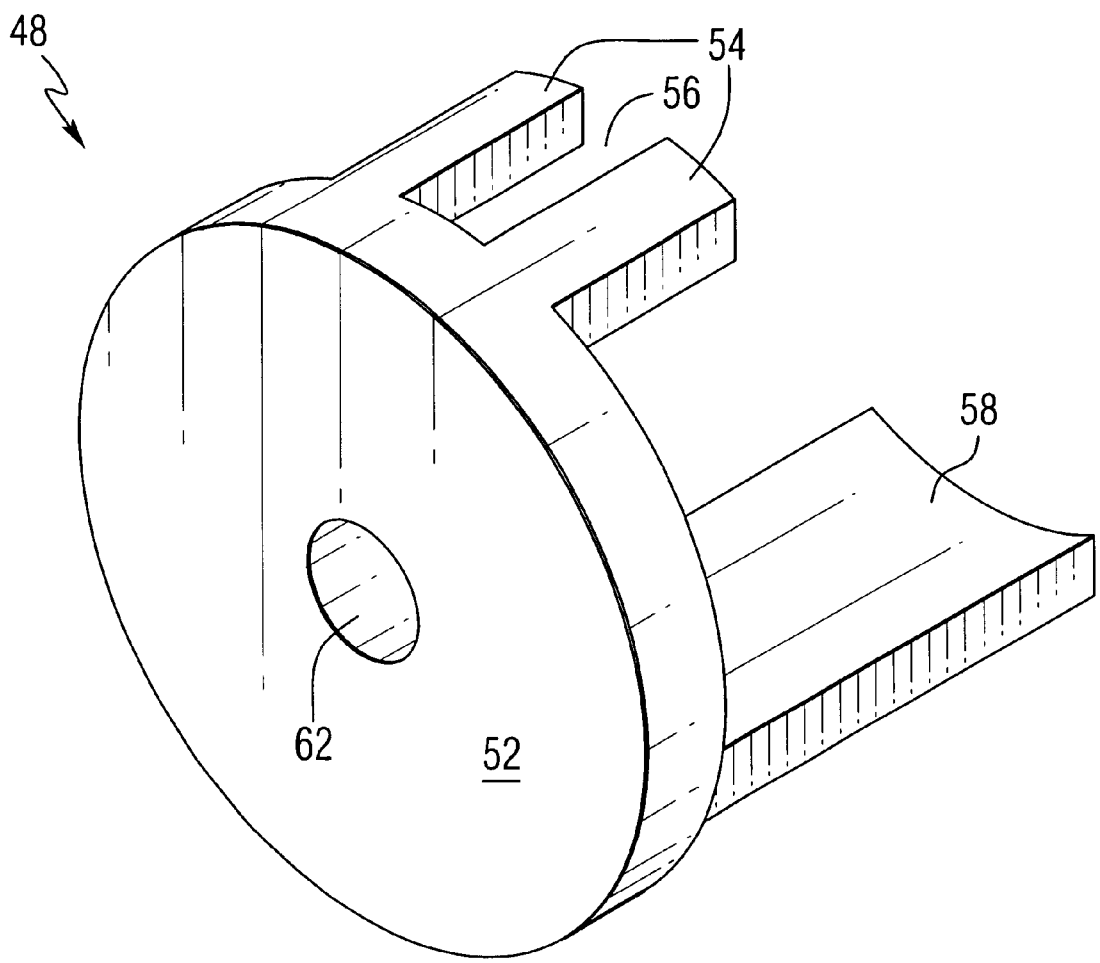
FIG. 3 is a perspective view of a coupling device of the present invention.

The stool 48, shown more particularly in FIG. 3, straddles the existing tee box 26 and the stabilizing bracket 34. Thus, the stool 48 is provided with at least two protuberant portions extending from its substantially cylindrical cover portion 52. The first protuberant portion 54 includes a slot 56, which receives the stabilizing bracket 34 therein. The first protuberant portion 54 abuts the inner wall 32 of the upper portion of the shroud 16. The second protuberant portion 58, is longer than the first protuberant portion 54. This is because the second protuberant portion 58 abuts the inner wall 32 of the lower portion of the shroud 16, which is not as thick as the upper portion. Of course, the ordinarily skilled artisan will recognize that this configuration is not limiting. For example, first and second protuberant portions 54, 58 could be of the same length when the stool 48 is used on the sparger below the one illustrated, where the upper portion of the shroud 16 does not exist. The substantially cylindrical cover 52 includes an opening 62 extending through it. This opening 62 receives the rod therein, and has a bottom 64 on which the head 47 of the rod abuts.

Referring now, once more, to FIG. 1, it can be seen that pipe 12 is fitted with a boss 13. The boss 13 is depicted as including threads in its internal circumference, however, these threads are not necessary for practicing the invention. If boss 13 does include threads, the threads would have a pitch that match corresponding threads 49 on rod 46. Additionally, a nut 15 is placed on the end of rod 46 to provide sufficient clamping force for the connection 10. The nut 15 may be threaded with mating threads for the rod 46. Thus, rotation of either the nut 15 or the rod 46, or both, will draw the pipe 12 toward the shroud 16, thereby providing the coupling force. Although the nut 15 and rod 46 are depicted as having mating threads, this is not a limiting arrangement. Any means of drawing the rod through boss 13, known to the skilled artisan, could be used. In any case, because the rod 46 is located within the pipe 12, the flow of fluid within the pipe will maintain the rod 46 and pipe 12 at the same temperature. This prevents differential thermal expansion from opening a gap in the joints between the pipe 12, the anchor socket 18, and the tee box 26.

Figure 4:
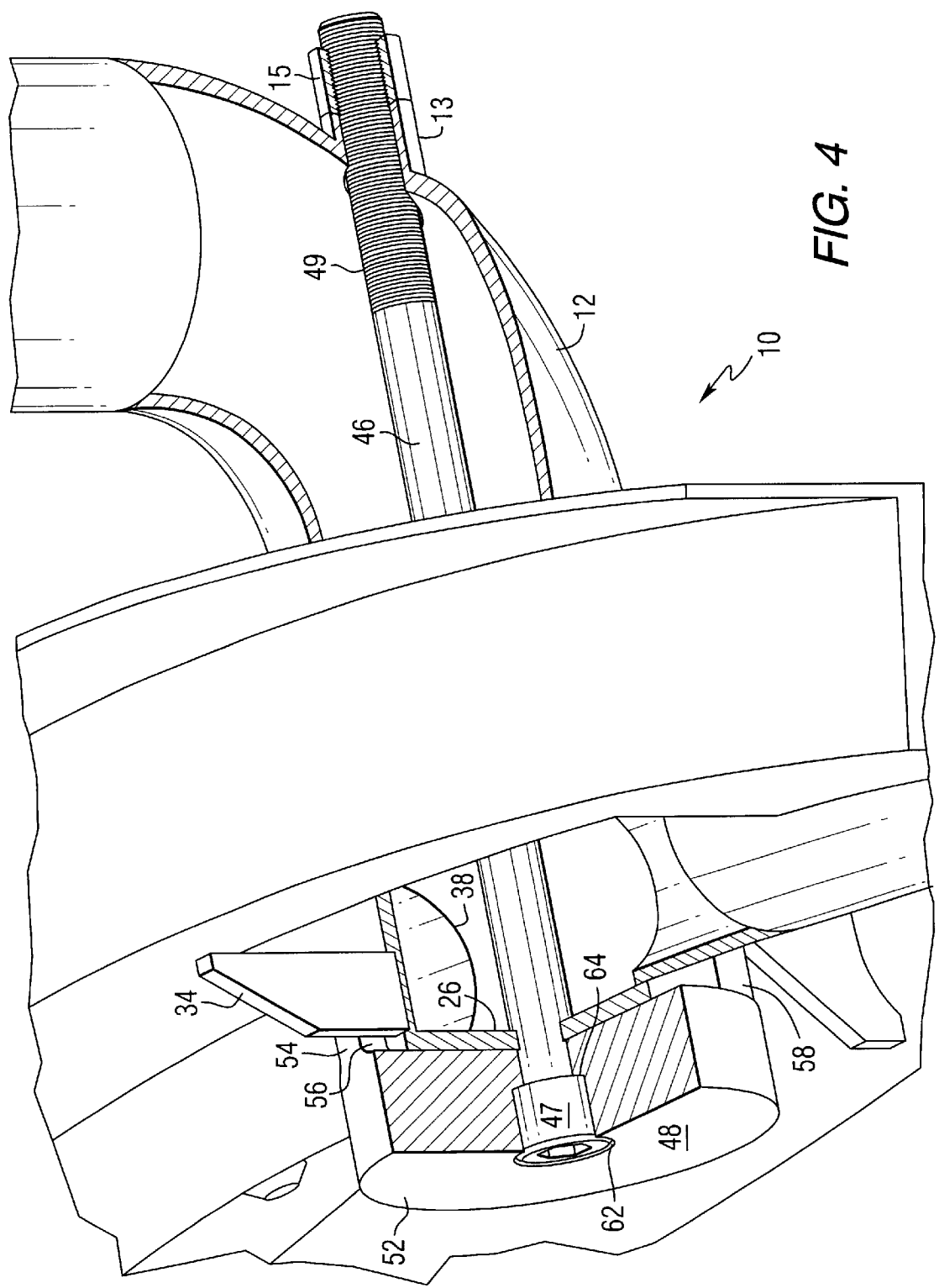
FIG. 4 is a partial cut-away perspective view of the core spray piping replacement connection of the present invention.
Figure 5:
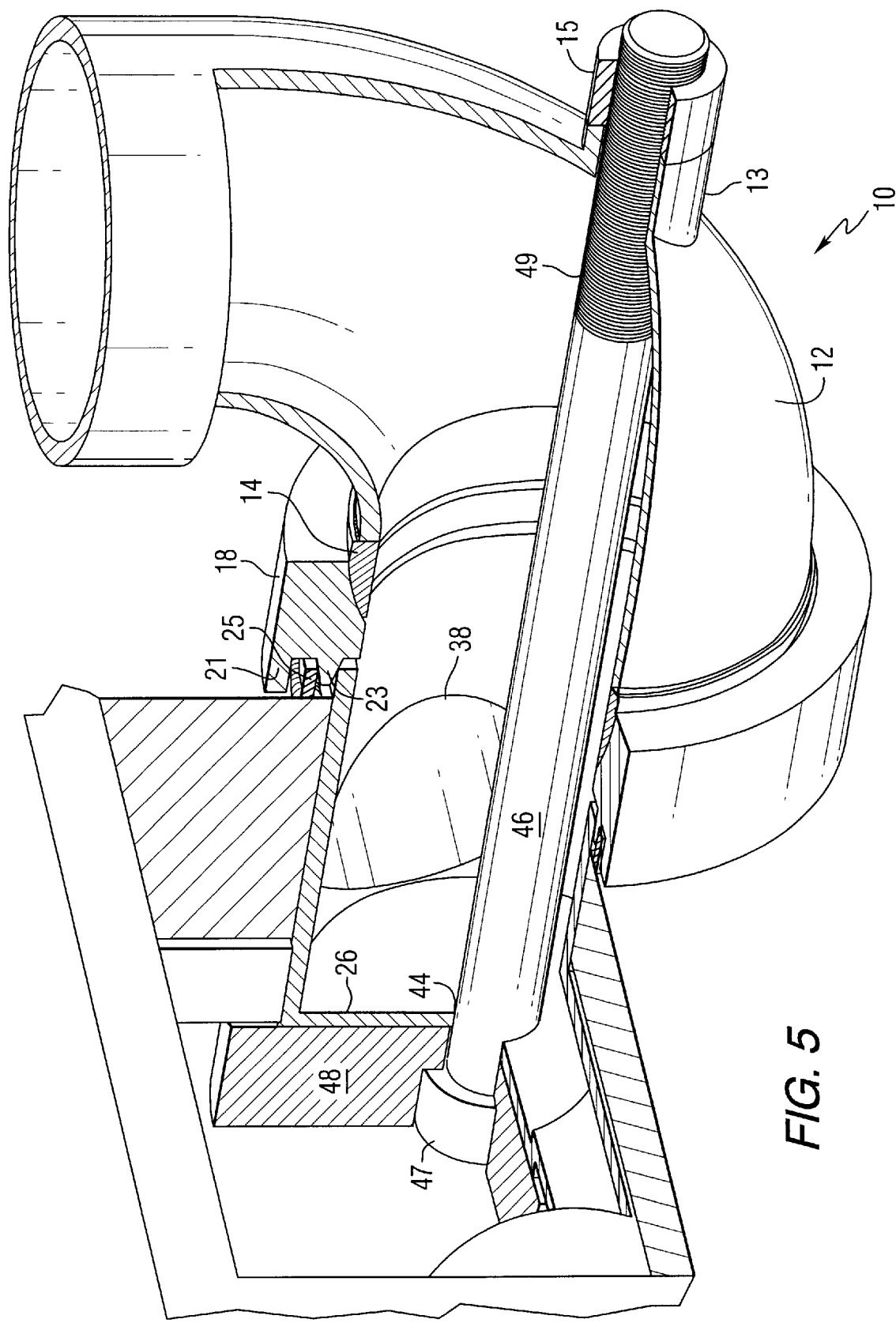
FIG. 5 is yet another partial cut-away perspective view of the core spray piping replacement connection of the present invention.

FIGS. 4 and 5 depict partial cut-away perspective views of the connection in its fully assembled condition. These figures are included to provide clear illustration of the connection 10 according to the preferred embodiment of the present invention.

The connection can be installed within the reactor vessel with relative ease. The existing downcomer pipe is cut away from the shroud 16 and tee box 26, leaving the tee box 26 and a portion of the preexisting safe end 25. A hole 44 is then made in the end 42 of tee box 26. The replacement pipe 12, including the ball 14, is inserted into the anchor socket 18 and mated with the seat 24. The pipe 12 and anchor socket 18 assembly are then positioned within the reactor vessel and against the outer wall 28 of the shroud 16, such that the first and second circumferential rings 21, 23, surround the safe end 25 and tee box 26, respectively. The stool 48 is then inserted into the reactor vessel and against the inner wall 32 of the shroud 16, such that the bracket 34 is received in the slot 56 of the first protuberant portion 54. The rod 46 is then inserted through the hole 62 of the stool 48, through the hole 44 in the tee box 26, through the anchor socket 18 and pipe 12, and into the boss 13. The nut 15 is then inserted onto the threads 49 of rod 46, and tightened to a predetermined torque for initial fit and then lowered to a specified load. The rod 46 may then be locked using a crimping process.

With the above-described connection, several technical, financial, and logistical advantages are obtained relative to known devices. The installation process is fast. A single hole and a single pipe cut are all that are needed for each tee box. The rod situated internal to the pipe allows for low leakage. No pre-measurements are required for installation. The ball and socket design reduces thermal and mechanical loads on existing parts. Vertical shear forces are transmitted to the shroud without going through a weld. And, finally, the connection is easily disassembled for maintenance and/or inspections.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

I claim:

1. A shroud connection device for replacement core spray piping systems in a boiling water reactor, comprising:
    a pipe having a rounded end, said pipe including a penetration extending through said pipe from an inside portion to an outside portion;
    a first coupling device having first and second ends, said first end being dimensioned so as to receive said rounded end, said second end abutting an outside portion of said shroud; said second end having first and second circumferential rings extending therefrom;
    a second coupling device having third and fourth ends, said third end abutting an inside portion of said shroud; and
    a rod extending between said second coupling device and said penetration;
    wherein said first circumferential ring abuts the outside portion of said shroud and is dimensioned so as to completely surround a safe end extending from said shroud, the safe end surrounding the first end of the piping connection; and said second circumferential ring completely surrounding the first end of the piping connection and being dimensioned so as to fit between the safe end and the first end of the piping connection.

2. A shroud connection device according to claim 1, wherein:
    said second end is dimensioned so as to completely surround at least a first end of a piping connection extending through said shroud; and
    said third end is dimensioned so a completely cover at least a second end of the piping connection.

3. A shroud connection device according to claim 2, wherein said piping connection is a tee connection.

4. A shroud connection device according to claim 1, wherein said first end comprises rounded seat for receiving said rounded end.

5. A shroud connection device according to claim 3, wherein said rounded seat is a spherically shaped seat.

6. A shroud connection device according to claim 1, wherein said rounded end is welded onto said pipe.

7. A shroud connection device according to claim 1, wherein said rounded end is an integral part of said pipe.

8. A shroud connection device according to claim 1, wherein said penetration includes threads on its internal surface that mate with threads on said rod.

9. A shroud connection device according to claim 1, wherein said penetration extending through said pipe comprises a boss extending from said pipe.

10. A shroud connection device according to claim 1, further comprising an adjustable nut received on an end of said rod and abutting said pipe proximate said penetration.

11. A shroud connection device according to claim 1, wherein said rounded end is a spherically shaped end.

12. A shroud connection device for replacement core spray piping systems in a boiling water reactor, comprising:
    a pipe having a rounded end, said pipe including a penetration extending through said pipe from an inside portion to an outside portion;
    a first coupling device having first and second ends, said first end being dimensioned so as to receive said rounded end, said second end abutting an outside portion of said shroud;
    a second coupling device having third and fourth ends, said third end abutting an inside portion of said shroud, wherein said third end comprises first and second protuberant portions; and
    a rod extending between said second coupling device and said penetration.

13. A shroud connection device according to claim 12, wherein said first protuberant portion includes a slot for receiving a bracket.

14. A shroud connection device according to claim 13, wherein said second protuberant portion has a length greater than said first protuberant portion.

15. A shroud connection device according to claim 13, wherein said second protuberant portion has a length equivalent to that of said first protuberant portion.

16. A device for connecting replacement core spray piping to a shroud in a boiling water reactor, comprising:
    flow directing means for directing core spray fluid flow within the reactor;
    interfacing means for (1) receiving an end of said flow directing means and (2) transmitting forces acting on said flow directing means to an outer wall of said shroud, said interface means completely surrounding an end of a piping connection extending between inner and outer walls of said shroud, said interface means having an inner ring spaced from said shroud outer wall and extending between said piping connection and a safe end extending from said shroud outer wall, said interface means having an outer ring disposed outwardly of said safe end and abuting said shroud outer wall;

means for providing a coupling force to couple said flow directing means to said interface means; and means for transmitting the coupling force to the inner wall of said shroud.

17. A device for connecting replacement core spray piping to a shroud in a boiling water reactor according to claim 16, further comprising:

first circumferential ring means protruding from said interface means for transmitting the forces acting on said flow directing conduit to the outer wall of said shroud; and second circumferential ring means protruding from said interface means providing an interference fit between the piping connection extending between the inner and outer walls of said shroud and a safe end extending from the outer wall of said shroud.

18. A device for connecting replacement core spray piping to a shroud in a boiling water reactor according to claim 17, wherein said coupling force transmitting means further comprises means receiving a bracket.

19. A device for connecting replacement core spray piping to a shroud in a boiling water reactor according to claim 17, further comprising:

boss means extending from an internal portion of said flow directing means to an external portion of said flow directing means, wherein said force coupling means includes threads thereon that are received by threads within said boss means.

20. A shroud connection device for replacement core spray piping systems for providing cooling water to a core within a shroud in a boiling water reactor, comprising:

a) a pipe having a spherically shaped end, said pipe including a penetration extending through said pipe from an inside portion to an outside portion, said penetration comprising a threaded boss extending from said pipe;

b) a first coupling device having first and second ends, said first end comprising:

a spherically shaped seat for receiving said spherically shaped end;

said second end comprising:

first and second circumferential rings extending therefrom, said first circumferential ring abutting an outside portion of said shroud and being dimensioned so as to completely surround a safe end extending from said shroud, the safe end surrounding a first end of a piping connection extending through said shroud, said second circumferential ring being dimensioned so as to fit between the safe end and the first end of the piping connection;

c) a second coupling device having third and fourth ends, said third end being dimensioned so as to completely cover at least a second end of the piping connection and comprising:

first and second protuberant portions which abut an inside portion of said shroud, said first protuberant portion including a slot for receiving a bracket;

d) a threaded rod extending between said second coupling device and said threaded boss; and e) an adjustable nut received on an end of said rod and abutting said boss.

21. A shroud connection device for replacement core spray piping systems in a boiling water reactor according to claim 20, wherein said second protuberant portion has a length greater than said first protuberant portion.

22. A shroud connection device for replacement core spray piping systems in a boiling water reactor according to claim 20, wherein said second protuberant portion has a length equivalent to that of said first protuberant portion.

23. A method of connecting core spray piping to a shroud of a boiling water reactor, comprising the steps of:

inserting a pipe having a spherically shaped end into a first end of a first coupling element;

positioning a second end of said first coupling element to completely surround at least a first end of a pipe connection extending through said shroud and fit a first coupling element inner ring between the shroud first end and a shroud safe end surrounding the shroud first end, and to abut a first coupling element outer ring against an outside portion of said shroud outwardly of the shroud safe end;

positioning a third end of a second coupling element to completely surround a second end of the pipe connection, and to abut an inside portion of said shroud;

connecting a tightening rod between said second coupling element and a penetration extending from an inside portion of said pipe to an outside portion; and adjusting said tightening rod.

24. A method of connecting core spray piping to a shroud of a boiling water reactor according to claim 23, further comprising the step of:

providing an opening in the second end of the pipe connection of sufficient dimension to allow said tightening rod to be inserted therethrough.

25. A method of connecting core spray piping to a shroud of a boiling water reactor according to claim 24, wherein said connecting step comprises:

inserting said tightening rod through a hole extending through said second coupling device, through the opening in the second end of the pipe connection, and through the penetration.

26. A method of connecting core spray piping to a shroud of a boiling water reactor according to claim 25, wherein said tightening rod includes threads thereon and said adjusting step comprises:

rotating a nut onto the threads of said adjusting rod and tightening said nut to a predetermined torque, and then lowering the torque to a specified value.

* * * * *